(12) United States Patent  (10) Patent No.: US 8,579,218 B2
Hammer et al.  (45) Date of Patent: Nov. 12, 2013

(54) FOOD WASTE DISPOSER WITH SELF-COMPENSATING BEARING ASSEMBLY

(75) Inventors: Randall E. Hammer, Muskego, WI (US); James Hansche, Racine, WI (US)

(73) Assignee: Emerson Electric Co., St. Louis, MO (US)

( * ) Notice: Subject to any disclaimer, the term of this patent is extended or adjusted under 35 U.S.C. 154(b) by 53 days.

(21) Appl. No.: 13/234,198

(22) Filed: Sep. 16, 2011

(65) Prior Publication Data
US 2012/0234950 A1 Sep. 20, 2012

Related U.S. Application Data

(60) Provisional application No. 61/387,523, filed on Sep. 29, 2010.

(51) Int. Cl.
*B02C 23/36* (2006.01)
(52) U.S. Cl.
USPC ............ 241/46.013; 241/46.014; 241/46.015; 241/46.08; 241/101.2
(58) Field of Classification Search
USPC .................. 241/46.013–46.016, 46.08, 101.2
See application file for complete search history.

(56) References Cited

U.S. PATENT DOCUMENTS

| 1,967,821 | A | 7/1934 | Hess |
| 2,345,564 | A | 4/1944 | Allen |
| 2,606,795 | A | 8/1952 | Button |
| 2,635,015 | A | 4/1953 | Babb |
| 2,840,425 | A | 6/1958 | Howell |
| 2,891,808 | A | 6/1959 | Richardson |
| 3,416,847 | A | 12/1968 | Herderhorst et al. |
| 3,588,201 | A | 6/1971 | Leviuown et al. |
| 3,623,781 | A | 11/1971 | Roos |
| 3,734,580 | A | 5/1973 | Piscitelli |
| 3,765,734 | A | 10/1973 | Peterson |
| 3,966,278 | A | 6/1976 | Lewis |
| 4,024,616 | A | 5/1977 | McCloskey |
| 4,053,190 | A | 10/1977 | McCloskey |
| 4,251,122 | A | 2/1981 | McCloskey |
| 4,309,062 | A | 1/1982 | Bischoff |
| 4,360,309 | A | 11/1982 | Reeves |
| 4,775,163 | A | 10/1988 | McGowan et al. |
| 5,743,659 | A * | 4/1998 | Stewart ................... 384/573 |
| 6,007,006 | A * | 12/1999 | Engel et al. ............. 241/46.014 |
| 6,068,405 | A * | 5/2000 | Harris et al. ................ 384/208 |
| 6,481,652 | B2 * | 11/2002 | Strutz et al. ............. 241/46.013 |
| 6,502,993 | B2 | 1/2003 | Sasaki et al. |
| 6,854,673 | B2 * | 2/2005 | Strutz et al. ............. 241/46.013 |
| 6,860,638 | B2 | 3/2005 | Fish |
| 7,648,282 | B2 | 1/2010 | Shore et al. |
| 2004/0173697 | A1 * | 9/2004 | Berger et al. ............. 241/46.013 |
| 2007/0145169 | A1 * | 6/2007 | Hanson et al. ............ 241/46.013 |
| 2008/0116305 | A1 * | 5/2008 | Hanson et al. ............ 241/46.013 |
| 2008/0235933 | A1 * | 10/2008 | Putt et al. .................. 29/525.01 |
| 2009/0060477 | A1 * | 3/2009 | Hirsch et al. ................ 388/811 |

\* cited by examiner

*Primary Examiner* — Dana Ross
*Assistant Examiner* — Onekki Jolly
(74) *Attorney, Agent, or Firm* — Harness, Dickey & Pierce, P.L.C.

(57) ABSTRACT

A food waste disposer system, including a food conveying section and a motor section. A grinding section is coupled between the food conveying section and the motor section. The motor section includes an electric motor having a rotor. The rotor has a rotor shaft entrained in at least one self-compensating bearing assembly. In an aspect, the self-compensating bearing assembly has a split spherical bearing and a compressive bearing pocket.

8 Claims, 3 Drawing Sheets

FOOD WASTE DISPOSER WITH SELF-COMPENSATING BEARING ASSEMBLY

CROSS-REFERENCE TO RELATED APPLICATIONS

This application claims the benefit of U.S. Provisional Application No. 61/387,523, filed on Sep. 29, 2010. The entire disclosure of the above application is incorporated herein by reference.

FIELD

The present disclosure relates to food waste disposers, and to motors and bearing assemblies used therefor.

BACKGROUND

This section provides background information related to the present disclosure which is not necessarily prior art.

A typical food waste disposer of the type that is disposed underneath a sink and is mounted to a drain opening of the sink includes a food conveying section, a motor section and a central grinding section disposed between the food conveying section and the motor section. The food conveying section conveys the food waste to the central grinding section. The grinding section typically has a shredder plate that is rotated relative to a stationary grind ring by an electric motor of the motor section. The motor has a rotor having a rotatable shaft coupled to the shredder plate. The electric motor is typically an induction motor, but may be other types of motors, such as brushless motors, universal motors, switched reluctance motors, and the like.

FIG. 1 depicts a prior art food waste disposer 100, which is described in U.S. Pat. No. 6,854,673. U.S. Pat. No. 6,854,673 is incorporated by reference herein in its entirety. The disposer 100 may be mounted in a well-known manner in the drain opening of a sink using conventional mounting members of the type disclosed in U.S. Pat. No. 3,025,007, which is incorporated herein by reference in its entirety. The disposer includes an upper food conveying section 102, a central grinding section 104 and a motor section 106, which may include a variable speed motor. It should be understood that motor section 106 could also include a fixed speed motor, such as an induction motor. The central grinding section 104 is disposed between the food conveying section 102 and the motor section 106.

The food conveying section 102 conveys the food waste to the central grinding section 104. The food conveying section 102 includes an inlet housing 108 and a conveying housing 110. The inlet housing 108 forms an inlet at the upper end of the food waste disposer 100 for receiving food waste and water. The inlet housing 108 is attached to the conveying housing 110. A rubber o-ring 112 may be used between the inlet housing 108 and conveying housing 110 to prevent external leaks. A sealant bead may also be used instead of the rubber o-ring 112. The sealant bead is preferably composed of a tacky, malleable material that fills any voids between the inlet housing 108 and the conveying housing 110 and tempers any irregularities in the opposing surfaces of the housings. Some suitable malleable materials for the sealant bead include butyl sealant, silicone sealant, and epoxy.

The conveying housing 110 has an opening 114 to receive a dishwasher inlet 116. The dishwasher inlet 116 is used to pass water from a dishwasher (not shown). The inlet housing 108 and conveying housing 110 may be made of metal or injection-molded plastic. Alternatively, inlet housing 108 and conveying housing 110 may be one unitary piece.

The central grinding section 104 includes a grinding mechanism having a shredder plate assembly 118 and a stationary shredder ring 120. In one embodiment, the shredder plate assembly 118 may include an upper rotating plate 122 and a lower lug support plate 124. The upper rotating plate 122 and lower lug support plate 124 are mounted to a rotor shaft 126 of a rotor 184 of motor 180 of motor section 106. A portion of the conveying housing 110 encompasses the grinding mechanism. The grinding mechanism shown in FIG. 1 is a fixed lug grinding system. Alternatively, a moveable lug assembly could be used such as that disclosed in U.S. Pat. No. 6,007,006 (Engel et al.), which is incorporated herein in its entirety by reference. The grinding mechanism could alternatively use both a fixed lug assembly and a moveable lug assembly.

The shredder ring 120, which includes a plurality of spaced teeth 128, is fixedly attached to an inner surface of the conveying housing 110 by an interference fit and is preferably composed of stainless steel but may be made of other metallic material such as galvanized steel. As shown in FIG. 1, ramps 129 formed on the inside wall of the housing 110 may also be used to retain the shredder ring 120 in the housing 110.

In the operation of the food waste disposer 100, the food waste delivered by the food conveying section 102 to the grinding section 104 is forced by lugs 142 on the shredder plate assembly 118 against teeth 128 of the shredder ring 120. Shredder plate assembly 118 may also include tumbling spikes 144. The sharp edges of the teeth 128 grind or comminute the food waste into particulate matter sufficiently small to pass from above the upper rotating plate 122 to below the plate via gaps between the teeth 128 outside the periphery of the plate 122. Due to gravity and water flow, the particulate matter that passes through the gaps between the teeth 128 drops onto a plastic liner 160 and, along with water entering into the disposer 100 via the inlet to the inlet housing 108, is discharged through a discharge outlet 162 into a tailpipe or drainpipe (not shown). To direct the mixture of particulate matter and water toward the discharge outlet 162, the plastic liner 160 is sloped downward toward the periphery side next to the discharge outlet 162. The discharge outlet 162 may be formed as part of a die-cast upper end bell 164. Alternatively, the discharge outlet 162 may be separately formed from plastic as part of the outer housing of the disposer. The outer surface of the discharge outlet 164 allows a tailpipe or drainpipe to be connected to the discharge outlet 162.

An upper end bell 164 separates the central grinding section 104 and the motor section 106. The motor section 106 is housed inside a housing 174 and a lower end frame 176. The housing 174 may be formed from sheet metal and the lower end frame 176 may be formed from stamped metal. The housing 174 and lower end frame 176 are attached to the upper end bell 164 by screws or bolts 178.

The motor section 106 includes motor 180 having a stator 182 and a rotor 184. Stator 182 includes windings 194. The rotor imparts rotational movement to the rotor shaft 126 of rotor 184. The motor 180 is enclosed within the housing 174 extending between the upper end bell 164 and lower end frame 176. The motor 180 may be a variable speed motor as described in U.S. Pat. No. 6,854,673 and controlled by a controller 220. Alternatively, a brushless permanent magnet motor or an induction motor could be used.

The upper end bell 164 may dissipate the heat generated by the motor 180, prevents particulate matter and water from contacting the motor 180, and directs the mixture of particulate matter and water to the discharge outlet 162.

The plastic liner 160 is attached to the die-cast upper end bell 164 by screws or bolts 166. The upper end bell 164 is attached to the conveying housing 110 by screws or bolts 168. To prevent external leaks, a ring bracket 170 and o-ring or seal 172 may be used to secure the connection between the conveying housing 110 and the upper end bell 164.

To align the rotor shaft 126 and, at the same time, permit rotation of the rotor shaft 126 relative to the upper end bell 164, the upper end bell 164 has a central bearing pocket 165 that houses a bearing assembly 200. In one embodiment, the bearing assembly 200 encompasses the rotor shaft 126 and comprises a sleeve bearing 202, a sleeve 204, a rubber seal 206, a slinger 208 and a thrust washer 210. The sleeve bearing 202 is pushed into the smaller portion of the central bearing pocket 165. The sleeve bearing 202 is preferably made of powered metal having lubricating material. The thrust washer 210 is placed on top of the bearing 202. The steel sleeve 204 encompasses the rotor shaft 126 and is positioned above the thrust washer 210 and sleeve bearing 202. The steel sleeve 204 resides on an upper end portion 127 of the rotor shaft 126. The upper end portion 127 is shaped as a double D to receive the shredder plate assembly 118. A bolt 211 is used to hold the shredder plate assembly 118 to the rotor shaft 126. To keep out debris, rubber seal 206 slides over the steel sleeve 204 and rests in a larger portion of the central bearing pocket 165 of the upper end bell 164. Steel cap or slinger 208 is placed on top of the rubber seal 206.

The bottom of the rotor shaft 126 is permitted to rotate relative to the lower end frame 176 by the use of lower bearing assembly 212. The lower bearing assembly 212 includes a housing 214 and a spherical bearing 216. The spherical bearing 216 is preferably made of powdered metal having lubricating material.

Mechanical and electrical (magnetic) imbalances are known problems in the fabrication of electric motors. In some instances, the motor rotors are machined in order to improve the mechanical balance. Some motor manufacturers use in-line electrical testing of the rotors to improve the magnetic balance.

It is desirable to minimize the air gap between the bearing and rotor shaft to reduce bearing noise. In one known technique of improving the clearance between the rotor shaft and bearing, the rotor shafts are ground to very tight tolerances and the bearings used also have very tight tolerances. A secondary burnishing operation may also be performed on the bearings to improve the consistency of the inside diameter after assembly.

SUMMARY

This section provides a general summary of the disclosure, and is not a comprehensive disclosure of its full scope or all of its features.

In accordance with an aspect of the present disclosure, a food waste disposer system has a food conveying section, a motor section, and a grinding section disposed between the food conveying section and the motor section. The motor section includes a motor having a rotor with a rotor shaft entrained in at least one self-compensating bearing assembly.

In an aspect, the self-compensating adjusting bearing assembly has a split spherical bearing and a compressive bearing pocket in which the split spherical bearing is received. The compressive bearing pocket has a pocket angle so that a wall of the compressive bearing pocket exerts a compressive force on the split spherical bearing compressing it diametrally against the rotor shaft.

In an aspect, the split spherical bearing has an axial slit allowing the inside diameter of the split spherical bearing to conform to the diameter of the rotor shaft when the split-spherical bearing is compressed.

In an aspect, the rotor shaft may be placed in tension by incorporating thrust surfaces at each end of the motor section that provide the necessary force to compress the bearings.

In an aspect, when the motor section of the food waste disposer is in a vertical position, the weight of the rotor and the solenoid forces of the motor provide a force on the split spherical bearing to force it down and against the wall of the compressive bearing pocket.

In an aspect, the pocket angle can be changed from one self-compensating bearing assembly to another to vary the diametral force exerted by the compressive bearing pocket on the split spherical bearing.

In an aspect, a secondary source of diametral compression of the split spherical bearing (or bearings) and/or axial force on the split spherical bearing (or bearings) is provided. In an aspect, a secondary source of diametral compression is a spring situated to apply diametral compressive force against an outer diameter of the split spherical bearing. In an aspect, a secondary source of axial force includes an adjustable collar situated around the rotor shaft in a threaded opening in an end wall of the motor section, an adjustable collar situated in a threaded opening in an end bell of the motor section, or adjustable collars situated in both threaded openings. The adjustable collar (or collars) is tightened or loosened to adjust the pressure on the split spherical bearing.

In an aspect, an electric motor has a stator and a rotor. The rotor has a rotor shaft entrained in at least one of the above self-compensating bearing assemblies. In an aspect, the motor has opposed ends with one such self-compensating bearing assembly at one of the opposed ends and another such self-compensating bearing assembly at the other of the opposed ends.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments, do not include all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
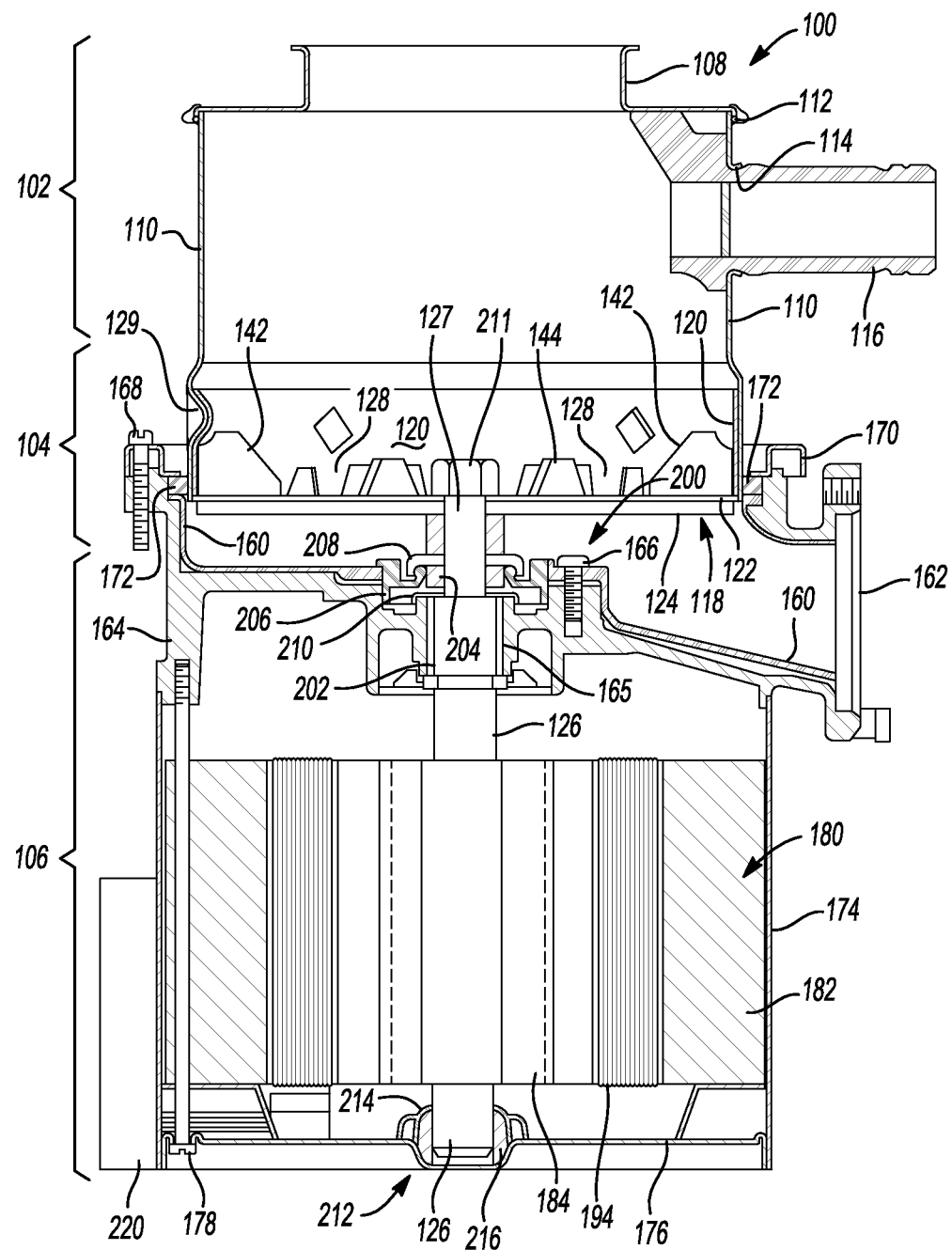
FIG. 1 shows a cross sectional view of a prior art food waste disposer.

In accordance with an aspect of the present disclosure, a self compensating bearing assembly described below is used for the upper bearing assembly, the lower bearing assembly, or both of the food waste disposer 100 of FIG. 1.

Figure 2:
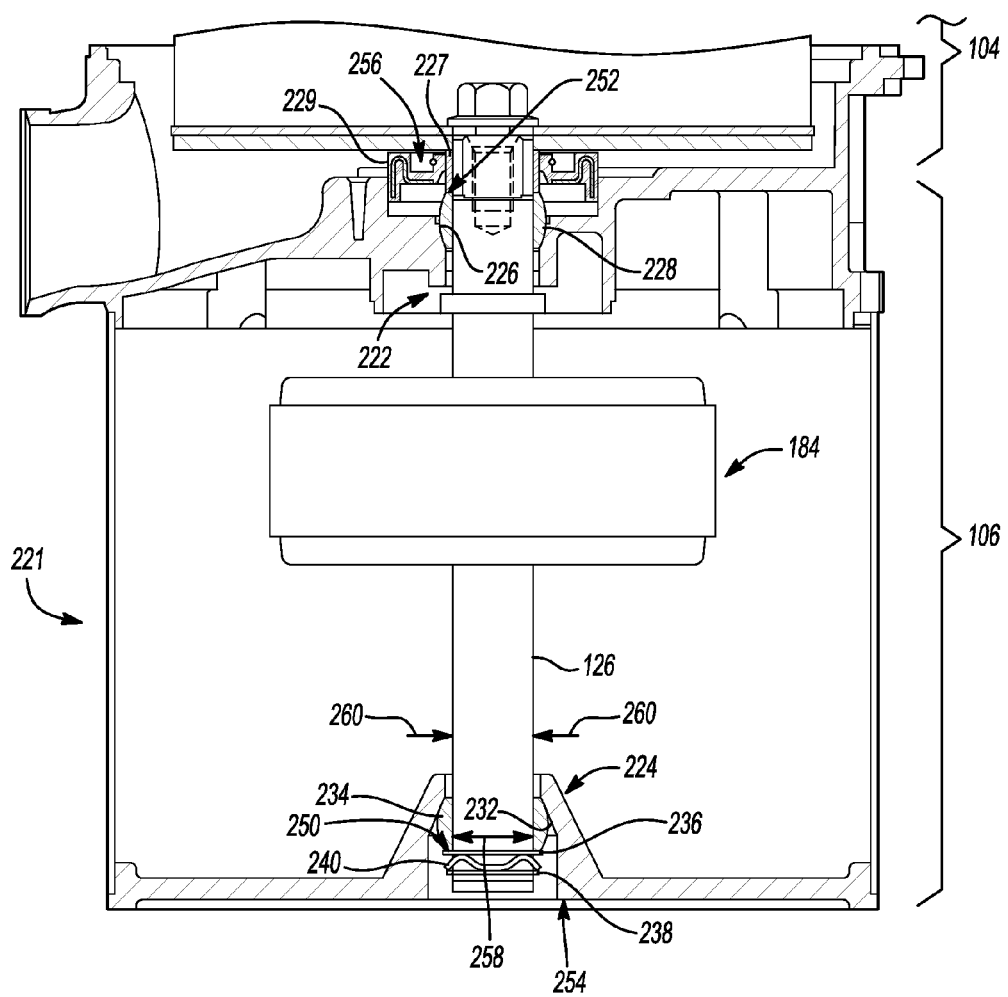
FIG. 2 shows a cross-sectional view of a lower portion of a food waste disposer having a self-compensating bearing assembly in accordance with an aspect of the present disclosure.

FIG. 2 shows a lower portion of a food waste disposer 221 having upper and lower self compensating bearing assemblies 222, 224 at opposed ends 254, 256 of motor section 106. Elements in common between food waste disposer 221 and food waste disposer 100 are identified with the same reference numbers with the following discussion directed to the differences.

In an aspect, upper self-compensating bearing assembly 222 includes an upper compressive bearing pocket 226 in which a split spherical bearing 228 that encompasses the rotor shaft 126 is received. Sleeve 227 is disposed around rotor shaft 126 at an outer side of split spherical bearing 228 and provides a thrust surface 252 against spherical bearing 228. Alternatively, a thrust washer can be disposed between sleeve 227 and spherical bearing 228 to provide thrust surface 252. Sleeve 227 is surrounded by a spring-loaded rubber seal 229.

Split spherical bearing 228 may be retained in the upper compressive bearing pocket 226 by a bearing retainer (not shown). Where the vertical force applied by the rotor 184 is sufficient to retain split spherical bearing 228 in upper compressive bearing pocket 226, the bearing retainer can be dispensed with. In an aspect, lower self-compensating bearing assembly 224 includes a lower compressive bearing pocket 232 in which a split spherical bearing 234 is received.

The rotor shaft 126 may be placed in tension by incorporating thrust surfaces 250, 252, at opposed ends 254, 256, respectively, of motor section 106 that provide the necessary force to compress the bearings. In the aspect shown in FIG. 2, lower self-compensating bearing assembly 224 has a thrust washer 236 around rotor shaft 126 that abuts a bottom of split spherical bearing 234. A retainer 238 (such as a retaining clip or retaining ring) and a spring washer 240 are placed over thrust washer 236 to urge split-spherical bearing 234 up into lower compressive bearing pocket 232 and also urge rotor shaft 126 downwardly thus placing rotor shaft 126 in tension. This also urges split spherical bearing 228 into upper compressive bearing pocket 226. In this embodiment, thrust washer 236, c-clip 238 and spring washer 240 cooperate to provide thrust surface 250.

Figure 3:
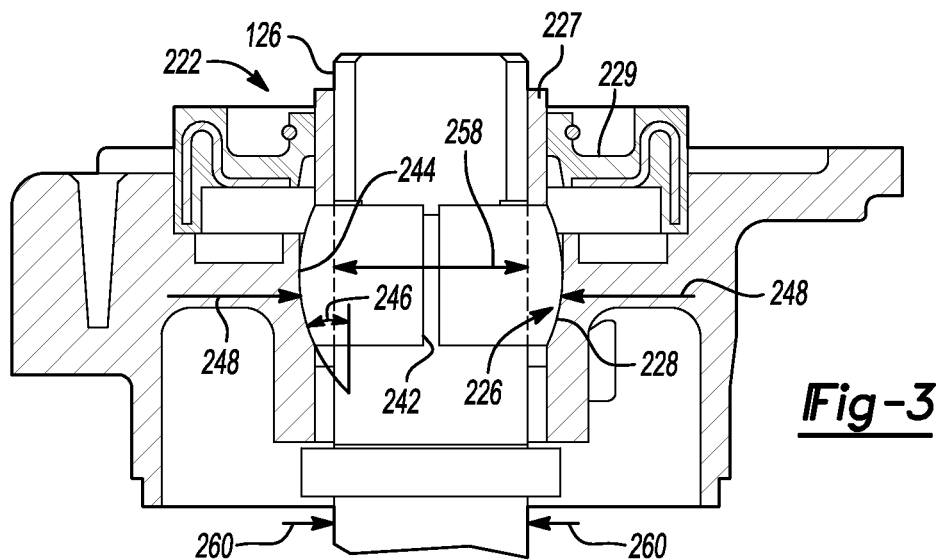
FIG. 3 shows a cross sectional view of a self-compensating bearing assembly of the food waste disposer of FIG. 2 in accordance with an aspect of the present disclosure.

FIG. 3 shows in more detail this embodiment of upper self-compensating bearing assembly 222 having split spherical bearing 228 and upper compressive bearing pocket 226, which can also be utilized for lower self-compensating bearing assembly 224. Split spherical bearing 228 has an axial slit 242 allowing an inside diameter 258 of split spherical bearing 228 to conform to an outside diameter 260 of rotor shaft 126 when split-spherical bearing 228 is compressed. Wall 244 of compressive bearing pocket 226 is shaped to have a pocket angle 246 so that wall 244 applies a diametral compressive force on split spherical bearing 228, shown by arrows 248, to minimize the clearance between the outside diameter of rotor shaft 126 and the inside diameter 258 of split spherical-bearing 228. The split spherical bearing 228 may preferably be made of a composition including powdered metal and lubricating material.

It should be understood that the pocket angle 246 can be changed from one self-compensating bearing assembly to another to vary the diametral force exerted by the compressive bearing pocket 226 on split spherical bearing 228 from one self-compensating bearing assembly to another.

When motor section 106 of food waste disposer 221 is in a vertical position, such as when food waste disposer 221 is mounted to a sink, the weight of rotor 184 and the solenoid forces of the motor 180 provide a force on split spherical bearing 228 to force it down and against wall 244 of upper compressive bearing pocket 226 sufficient to compress split spherical bearing 228 due to the opposing diametral compressive force exerted by the upper compressive bearing pocket 226 on split spherical bearing 228. The pocket angle 246 can be adjusted when designing the upper compressive bearing pocket 226 to achieve the proper balance between the weight of the rotor 184, the spring rate of the split spherical bearing 228, and the amount of diametral compression that the split spherical bearing 228 exhibits.

Figure 4:
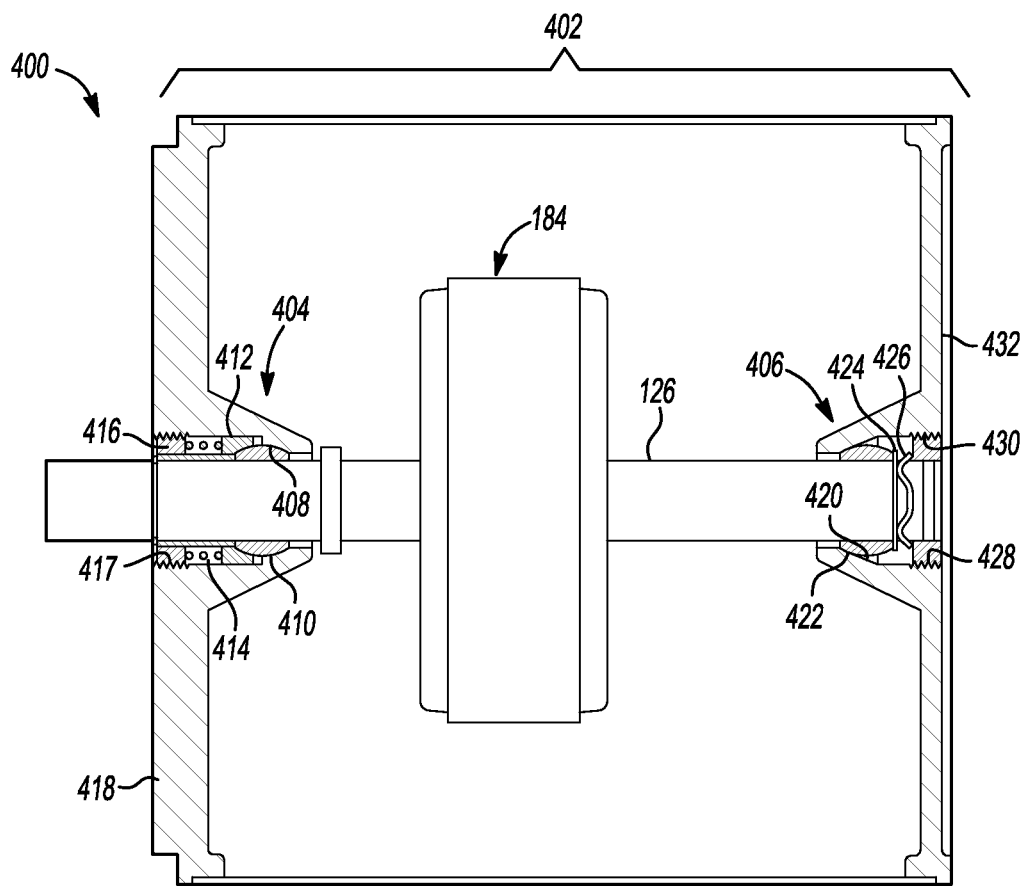
FIG. 4 shows a motor section of a food waste disposer having a self-compensating bearing assembly and components that apply an axial force thereto in accordance in accordance with an aspect of the present disclosure.

In an aspect, motor section 106 can be disposed in a horizontal position, as shown in FIG. 4. In this position, a secondary source of diametral compression and/or axial force may be provided. For example, a spring may be used to apply diametral compressive force against an outer diameter of the split spherical bearing. An adjustable collar (or collars) may be used to apply axial force to one or both of the split spherical bearings.

FIG. 4 shows a motor section 402 of a food waste disposer 400 in which axial force is applied. With the following differences discussed below, food waste disposer 400 is the same as food waste disposer 221 of FIG. 2 and like elements will be identified with the same reference numbers. The self-compensating bearing assemblies are oriented horizontally with respect to each other in FIG. 4 and will be referred to as left self-compensating bearing assembly 404 and right self-compensating bearing assembly 406. Left self-compensating bearing assembly 404 includes a compressive bearing pocket 408 in which a split spherical bearing 410 that encompasses the rotor shaft 126 is received. A bearing retainer 412 abuts an outer side of split spherical bearing 410. A coil spring 414 is disposed between an outer side of bearing retainer 412 and an inner side of an adjustable collar 416. Adjustable collar 416 is threadably received in a threaded opening 417 in end bell 418 around rotor shaft 126. It should be understood that coil spring 414 may be eliminated for more precise control of the diameter of split-spherical bearing 410.

Right self-compensating bearing assembly 406 includes a compressive bearing pocket 420 in which a split spherical bearing 422 that encompasses rotor shaft 126 is received. A thrust washer 424 abuts an outer side of split-spherical bearing 422. A spring washer 426 is disposed between thrust washer 424 and an adjustable collar 428. Adjustable collar 428 is threadably received in a threaded opening 430 in a right end wall 432 of motor section 402 around rotor shaft 126.

One or both adjustable collars 416 and 428 can be tightened or loosened in respective threaded openings 417, 430 to adjust the pressure on split spherical bearings 410, 422.

It should be understood that the self-compensating bearing assembly described above can be used in applications other than food waste disposers. In such cases, the motor may include the self-compensating bearing assemblies.

The foregoing description of the embodiments has been provided for purposes of illustration and description. It is not intended to be exhaustive or to limit the invention. Individual elements or features of a particular embodiment are generally not limited to that particular embodiment but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A food waste disposer comprising:
a food conveying section, a motor section and a grind and discharge section, the grind and discharge section disposed between the food conveying section and the motor section, the food conveying section conveying food waste to a grind section of the grind and discharge section;
the grind section including a grind mechanism, the grind mechanism including a stationary grind ring and a rotating shredder plate assembly rotated by an electric motor of the motor section that rotates within the stationary grind ring to grind food waste;
the rotating shredder plate assembly including a shredder plate with one or more lugs; and
the motor having a stator and a rotor, the rotor having a rotor shaft entrained in at least one self-compensating bearing assembly, the self-compensating bearing assembly having a compressible bearing having an inside diameter that is reduced when the bearing is compressed to conform the inside diameter to an outside diameter of the rotor shaft.

2. The food waste disposer of claim 1, wherein the compressible bearing is a split spherical bearing and the self-compensating bearing assembly includes a compressive bearing pocket in which the split spherical bearing is received, the compressive bearing pocket having pocket angle so that a wall of the compressive bearing pocket exerts a compressive force on the split spherical bearing, compressing it against the rotor shaft.

3. The food waste disposer of claim 2 wherein the split spherical bearing has an axial slit allowing an inside diameter of the split spherical bearing to conform to an outside diameter of the rotor shaft when the split-spherical bearing is compressed.

4. The food waste disposer of claim 1 wherein the motor section includes thrust surfaces at opposed ends of the motor section that apply compressive force to the self-compensating bearing assembly and place the rotor shaft in tension.

5. The food waste disposer of claim 2 wherein when the motor section is in a vertical orientation, a weight of the rotor and solenoid forces of the motor provide a force on the split spherical bearing to force it down and against the wall of the compressive bearing pocket.

6. The food waste disposer of claim 1 wherein the motor section includes opposed ends and the at least one self-compensating bearing assembly includes one such self-compensating bearing assembly at one of the opposed ends of the motor section and another such self-compensating bearing assembly at the other opposed end of the motor section.

7. The food waste disposer of claim 6 wherein when the motor section is in a vertical orientation, the self-compensating bearing assemblies are an upper self-compensating bearing assembly and a lower self-compensating bearing assembly.

8. The food waste disposer of claim 2 wherein the motor section includes a secondary source of diametral compression of the split spherical bearing.

* * * * *